May 6, 1930.   W. PEARSON   1,757,056
SIPHON STARTER

Filed April 9, 1928

WALDEMAR PEARSON
INVENTOR

PER Albert J. Fike
ATTORNEY

Patented May 6, 1930

1,757,056

UNITED STATES PATENT OFFICE

WALDEMAR PEARSON, OF CHICAGO, ILLINOIS

SIPHON STARTER

Application filed April 9, 1928. Serial No. 268,788.

This invention relates to improvements in a siphon starting device and has for one of its principal objects the provision of means for creating a vacuum in a rubber hose or the like for operating a siphon, for the withdrawal of liquids from a vat, tank or from any receptacle where access cannot be readily had to the contents.

A common method of creating a vacuum in rubber hose or the like, has been to insert one end of the hose in the liquid to be raised and then squeezing and rubbing the hose between the thumb and forefinger in a direction toward the open end of the hose. This method of creating a vacuum is at best an awkward and trying operation requiring considerable strength, and is not always very satisfactory, especially when a liquid of high viscosity is to be siphoned, such as a heavy grade of automobile oil or the like.

Another means of starting a siphon is by sucking the air from the hose at its outer end. It is obvious that this method is limited to the nature of the liquid to be siphoned. For instance no one would attempt to suck into his mouth gasoline, lubricating oil, denatured alcohol or any such unwholesome liquid.

One of the important objects of this invention is to provide means for positively and quickly creating a vacuum in a rubber hose or tube regardless of the nature of the liquid, as to either its wholesomeness or viscosity.

Another important object of the invention is its simplicity of construction and operation. The device consists of a minimum of parts and can be economically manufactured and marketed.

Other and further important objects of the invention will be apparent from the disclosures in the accompanying drawings and following specification.

The invention, in a preferred form, is illustrated in the drawings and hereinafter more fully described.

Figure 2:
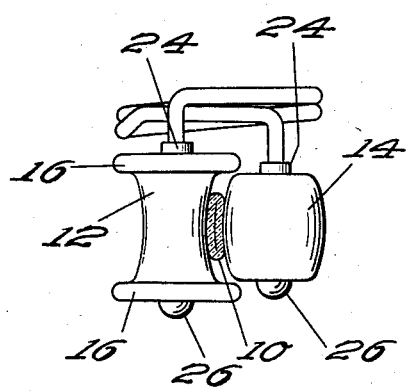
Figure 2 is a top plan view of the device, showing a sectional view of the compressed hose.
Figure 3:
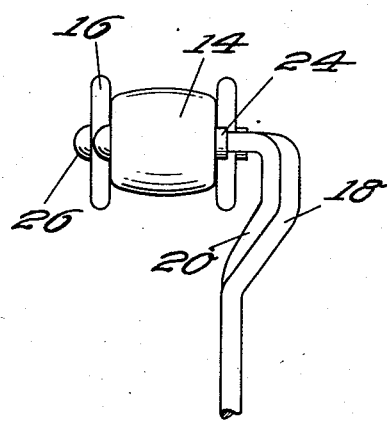
Figure 3 is a partial end elevation of the siphon starter.
Figure 1:
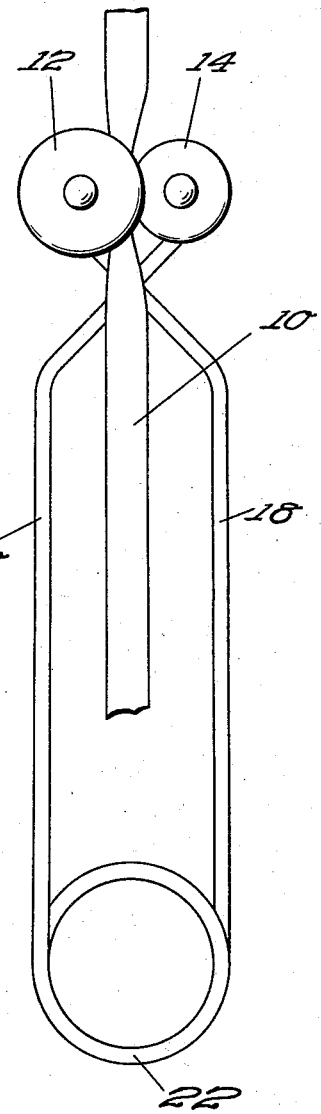
Figure 1 is a side elevation of the invention, illustrating it in operative position.

The reference numeral 10 indicates generally a flexible hose, tubing or the like adapted to be positioned between rollers 12 and 14 mounted on arms 18 and 20 of the apparatus. The roller 12 is preferably constructed in the shape of a capstan drum, the two ends of which terminate in radial flanges 16. The drum 14 is preferably of a crown face construction, the rolling surface of which is adapted to register with the convex surface of the drum 12.

The two drums 12 and 14 are rotatably mounted upon the upper ends of a set of tongs having arms 18 and 20 respectively. Both of the arms 18 and 20 form parts of one continuous rod, formed at its middle to provide a helical spring 22. Each of the outer ends of the arms 18 and 20 is bent at an angle of approximately 45 degrees toward each other, the ends of the arms crossing at right angles to each other. At substantially their outer ends the arms are again bent at right angles to themselves, each portion so bent being parallel to the other. It is upon these last mentioned bent portions that the rollers 12 and 14 are journaled. Lateral motion of the rollers is prevented by means of the retaining nuts 24 and 26 at the inner and outer ends of the drums respectively.

Figure 4:
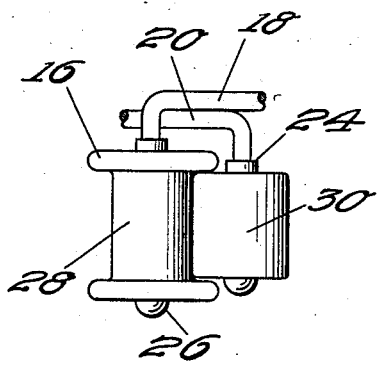
Figure 4 is a top plan view of a modification of the device.

A modification of the invention is shown in Figure 4, rollers 28 and 30 each have flat rolling surfaces, the roller 28 being provided with the radial flanges as shown at 16, and the roller 30 fitting inside these flanges.

It is apparent that herein is provided a device, the utility of which is unquestioned, and its simplicity of operation and construction will appeal to everyone who may have occasion to use a siphon means for conveying a liquid from a vessel, the contents of which are otherwise inaccessible.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A siphon starting device including in combination, a pair of tongs, comprising a rod bent double upon itself, the central portion of which forms a helical spring, the upper ends of the arms of which are bent to cross at right angles to each other and hence back-turned inwardly to a parallel relation, and co-operating rollers mounted on the inturned ends of the arms of the tongs, one roller having a concave rolling surface and the other roller having a convex rolling surface, the rolling surface of each roller registering with the rolling surface of the other, the concave roller being provided with a radial flange at either end thereof.

In testimony whereof I affix my signature.

WALDEMAR PEARSON.